US006604106B1

(12) United States Patent
Bodin et al.

(10) Patent No.: US 6,604,106 B1
(45) Date of Patent: Aug. 5, 2003

(54) COMPRESSION AND DELIVERY OF WEB SERVER CONTENT

(75) Inventors: William Kress Bodin, Austin, TX (US); Ted Ralph Mueller, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,212

(22) Filed: Dec. 10, 1998

(51) Int. Cl.[7] .......................... G06F 17/30; G06F 15/16; G06F 15/00
(52) U.S. Cl. .......................... 707/101; 707/10; 707/102; 709/203; 715/513; 715/523
(58) Field of Search ................................ 707/101, 102, 707/104, 204, 9, 10, 104.1; 709/223, 224, 225, 203, 231, 229; 715/513, 523

(56) References Cited

U.S. PATENT DOCUMENTS

| | | | | |
|---|---|---|---|---|
| 5,802,520 A | * | 9/1998 | Jerkunica et al. | 707/101 |
| 5,850,565 A | * | 12/1998 | Wighman | 315/821 |
| 5,951,623 A | * | 9/1999 | Reynar et al. | 708/203 |
| 5,953,500 A | * | 9/1999 | Katakura | 395/111 |
| 6,112,250 A | * | 8/2000 | Appelman | 709/247 |
| 6,144,992 A | * | 11/2000 | Turpin et al. | 709/208 |
| 6,281,874 B1 | * | 8/2001 | Sivan et al. | 345/2.1 |
| 6,292,827 B1 | * | 9/2001 | Raz | 709/217 |
| 6,336,118 B1 | * | 1/2002 | Hammond | 707/103 |

OTHER PUBLICATIONS

Philion, Paul, "Build servlet–based enterprise Web applications; Learn to buile better, faster servlets with advanced servlet techniques", JavaWorld, Proquest, Dec. 1, 1998, p. 1–9.*

Lakos, Charles and Lewis, Glenn, "Animating Formal Specifications Using Java Applets", IEEE, Nov. 24–28, 1997, pp. 196–208.*

Sabharwal, C.L., "Java, Java, Java", IEEE, Aug./Sep. 1998, pp. 33–37.*

Liang, Shen and Bracha, Gilad, "Dynamic Class Loading in the Java Virtual Machine", ACM, Oct. 1998, pp. 36–43.*

* cited by examiner

Primary Examiner—Vincent Millin
Assistant Examiner—Ella Colbert
(74) Attorney, Agent, or Firm—Winstead Sechrest & Minick P.C.; Jeffrey S. LaBaw

(57) ABSTRACT

A server-side mechanism together with an optional client-side decompression process enhance server content delivery. The server-side mechanism preferably comprises a pair of processes: a daemon process and a servlet process. The daemon process recursively compresses directories of content (HTML, graphics files, and the like) while instances of the servlet process, in parallel, serve content. When a target directory is completely compressed, the files which previously existed in an uncompressed state are either archived or deleted. The servlet process interprets the compressed objects, resolving the connection between the client and server, and serves out the requested content. If the request originates from a client that is not enabled to decompress files, the servlet decompresses the requested files on-the-fly. When supported on a given client machine, the client process decompresses the streaming content for use on the client system.

5 Claims, 2 Drawing Sheets

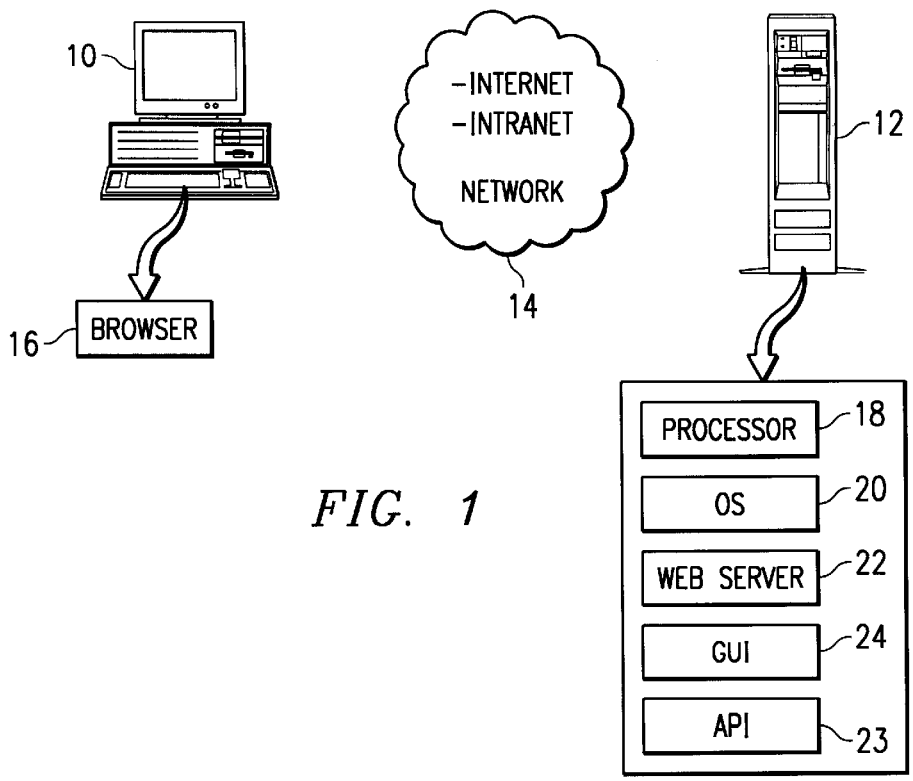
FIG. 1
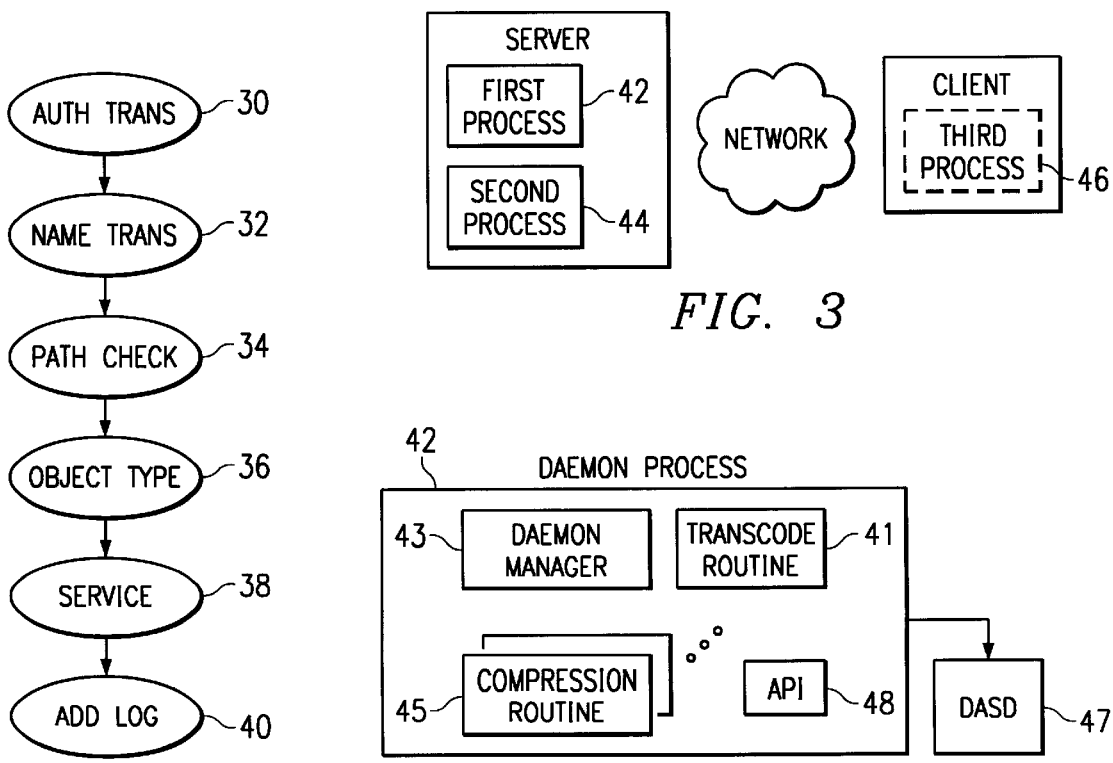
FIG. 2
FIG. 3
FIG. 4

COMPRESSION AND DELIVERY OF WEB SERVER CONTENT

BACKGROUND OF THE INVENTION

1. Technical Field

This invention relates generally to information retrieval in a computer network. More particularly, the invention relates to a method and system for reducing the amount of storage space required to support Web server content and for improving the manner in which such content is served in response to client requests.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML. A collection of documents supported on a Web server is sometimes referred to as a Web site.

A conventional Web server uses a direct access storage device (DASD) to store content files. Such files are stored in an uncompressed state. A given server often supports many different Web sites, each identified by a URL. A URL may have associated therewith multiple subdirectories, with each such subdirectory comprising numerous files. Many of those files are large, rich media files that have significant storage overhead.

With the current usage of the Internet as a mechanism for distributing graphics-intensive files and other information (including software), many content intensive sites exhibit low performance in both loading and rendering on client machines. One primary reason for this problem is simply the size of the server files that must be downloaded to a given client machine in response to an HTTP request. The problem of increasingly slow server download delivery has been addressed historically by making large investments in high performance hardware (e.g., modems, faster servers, and the like). While this approach has ameliorated the problem to some degree, improving hardware performance is quite costly.

Increasing bandwidth is another approach to addressing slow server downloads. This approach also has its benefits, but the operator of an individual Web server (or server farm) has little control over the Internet backbone and other network devices that facilitate the actual transmissions).

It would be desirable to provide a server-centric approach to resolving prior art server storage and delivery problems.

BRIEF SUMMARY OF THE INVENTION

It is a primary object of this invention to provide server-side methods for optimizing storage of server content and for dynamically serving such content in response to client requests.

It is another primary object of this invention to increase the delivery effectiveness of a server operating in a computer network.

Another object of this invention is to provide a mechanism for conserving storage space on a Web server and (assuming client support) for reducing the size of the data stream served to a client browser in response to an HTTP client request.

A more specific object of this invention to decrease DASD storage requirements on a Web server, thereby extending the useful life of the server's existing hardware.

A more general object of this invention is to better organize content on a Web server for effective storage and delivery. As a by-product, owners and operators of Web server may receive the benefits of existing investments in their server hardware.

These and other objects of the invention are realized using a server-side mechanism together with an optional client-side decompression process. The server-side mechanism preferably comprises a pair of processes: a daemon process and a servlet process. The daemon process is a server-side executable that executes seamlessly and transparently to the regular operation and Web serving tasks on the host. The daemon process recursively compresses directories of content (HTML, graphics files, and the like) while the server, in parallel, serves content. When a target directory is completely compressed, the files which previously existed in an uncompressed state are either archived or deleted.

The servlet process interprets the compressed objects, resolving the connection between the client and server, and serves out the requested content. If the request originates from a client that is not enabled to decompress files, the servlet decompresses the requested files on-the-fly. The servlet also resolves connections when a client requests only partial content requested from within a compressed group of files. The daemon and servlet processes preferably operate asynchronously to each other.

When supported on a given client machine, the client process decompresses the streaming content for use on the client system. This functionality is implemented in a manner consistent with the architecture of the client browser.

Each of the processes of the present invention includes an application programming interface (API), namely, a program entry point, that allows the respective process to be extended by other software. As a result, different types of compression and their corresponding decompression routines are plug compatible with the architecture. Further, by interfacing through the API, the daemon and the servlet may readily support other markup language types (e.g., SGML, XML, HDML, and others) so that the inventive architecture is compatible with Internet appliances and other pervasive computing devices (e.g., palmtops, PDAs, cell phones, and the like) that do not include the full HTML function set.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a representative system in which the present invention is implemented;

FIG. 2 is a flowchart illustrating the conventional processing associated with an HTTP request from the Web client to the Web server shown in FIG. 1;

FIG. 3 is a block diagram of the processes used in the present invention to provide compression and dynamic delivery of Web server content;

FIG. 4 is a block diagram of the daemon process of the present invention;

DETAILED DESCRIPTION OF THE PREFERRED EMBODIMENT

Figure 5:
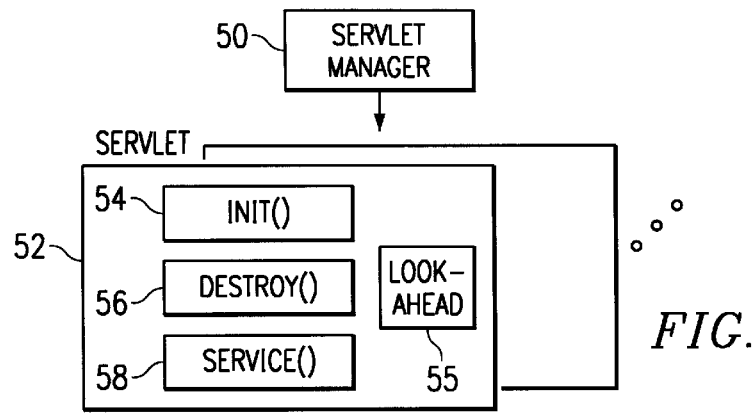
FIG. 5 is a block diagram of the servlet process of the present invention.

A known Internet client-server system is implemented is illustrated in FIG. 1. A client machine 10 is connected to a Web server 12 via network 14. For illustrative purposes, network 14 is the Internet, an intranet, an extranet or any other known network. Web server 12 is one of a plurality of servers which are accessible by clients, one of which is illustrated by machine 10. A representative client machine includes a browser 16, which is a known software tool used to access the servers of the network. The Web server supports files (collectively referred to as a "Web" site) in the form of hypertext documents and objects. In the Internet paradigm, a network path to a server is identified by a so-called Uniform Resource Locator (URL).

A representative Web server 12 is an IBM Netfinity server comprising a RISC-based processor 18, the AIX® operating system 20 and a Web server program 22, such as Netscape Enterprise Server. The server 12 also includes a display 24 supporting a graphical user interface (GUI) for management and administration, and an Application Programming Interface (API) 23 that provides extensions to enable application developers to extend and/or customize the core functionality thereof through software programs including Common Gateway Interface (CGI) programs, plug-ins, servlets, active server pages, server side include (SSI) functions or the like.

A representative Web client is a personal computer that is x86-, PowerPC®- or RISC-based, that includes an operating system such as IBM® OS/2® or Microsoft Windows '95, and that includes a Web browser, such as Netscape Navigator 4.0 (or higher), having a Java Virtual Machine (JVM) and support for application plug-ins or helper applications.

The Web server accepts a client request and returns a response. The operation of the server program 22 is governed by a number of server application functions (SAFs), each of which is configured to execute in a certain step of a sequence. This sequence, illustrated in FIG. 2 by way of background only, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded.

FIG. 3 illustrates the main components of the invention. They include a pair of processes that execute on the server and, optionally, a process that executes on the client. The server processes comprise first process 42 and second process 44. The client process is a third process 46, which is used to manage decompression on the client. In general, first process 42 is used for compressing files on the server, and second process 44 is used to satisfy client HTTP requests. Second process 44 operates to serve compressed files if a client request initiates from a client that supports the third process 46; alternatively, second process 44 operates to decompress compressed files prior to serving the resulting content if the client request initiates from a client that does not support the third process 46.

In a representative embodiment, first process 42 is a platform executable daemon, second process 44 is a Java servlet, and third process 46 is a Java applet. As is well-known, a Java servlet or applet, as the case may be, comprises class files executable in a Java Virtual Machine (JVM). A conventional Web browser typically includes a JVM; thus, the respective servlet and applet processes are executable within the content of an existing Web server and Web client architecture. A client machine that supports the third process is sometimes referred to herein as a "plug-in enabled" client because it includes support for a given decompression routine.

According to the invention, the daemon process 42 is a server side executable that executes seamlessly and transparently to the regular operation of the Web serving tasks running on the computer. As seen in FIG. 4, the daemon process 42 includes a daemon manager 43 and a compression routine 45. In operation, the deamon manager 43 schedules files for compression by the compression routine 45 as those files are created or updated. The daemon manager 43 stores the resulting compressed files in DASD 47. In operation, manager 43 recursively navigates through the Web server directories, compressing the content (using compression routine 45), and storing the resultant compressed binary files, preferably within their respective subdirectories. This operation occurs as the server (and, in particular, the servlet process), in parallel, is serving content. The compressed binary files may be moved from their origin directories and stored elsewhere provided the servlet has access to a mapping file from which it may obtain the location of these files.

Thus, the deamon process operates asynchronously with respect to other server operations including the servlet process. When the daemon process is finished compressing a target directory, the files that previously existed in an uncompressed state are either archived (in DASD 47) or deleted depending on a configuration setting for the process. These operations are effected by the daemon manager 43. As is well-known, a dialog panel may be used in a conventional manner to establish and/or modify those configuration settings. The particular panel interface is created by the daemon manager 43.

The daemon process 42 thus provides significant space savings on the DASD by compressing files on the server. Preferably, the daemon process is configurable to compress all directories on the server, certain directories on the server, or other selected content. Thus, for example, a given Web server may be responsible for serving one or more Web sites. In such case, the administrator may desire to compress a given directory (corresponding to a first Web site or URL) while maintaining other directories (corresponding to a second Web site or URL) uncompressed. The daemon process includes a configurable interface through which the administrator may specify particular subdirectories on the DASD 47 corresponding to each such site.

The deamon process 42 is also preferably configurable to aggregate given files into a single binary file (e.g., a zip file). In addition, the deamon process 42 may also be configured to "transcode" files from one source markup language to another markup language. This function is provided by transcode routine 41. As an example, assume it is desired to render given content originally written in HTML on a pervasive computing client (e.g., a PDA such as the IBM WorkPad™, a smartphone, a palmtop device, any Internet appliance, or the like) that does not support the full function set of an HTML Windows-based client. In such case, it is necessary to transcode the HTML-based file into a format (e.g., HDML or handheld device markup language) compatible with such a device so that the file may be appropriately rendered on the client. To this end, the deamon includes an API 48 (namely, a program entry point) that allows the daemon to be extended by other software. This enables the daemon to readily support other markup language types (e.g., SGML, XML, HDML, and others). In addition, different types of compression routines 45 are "plug" compatible with the daemon by interfacing through the API. This significantly enhances the flexibility of the inventive architecture.

Figure 6:
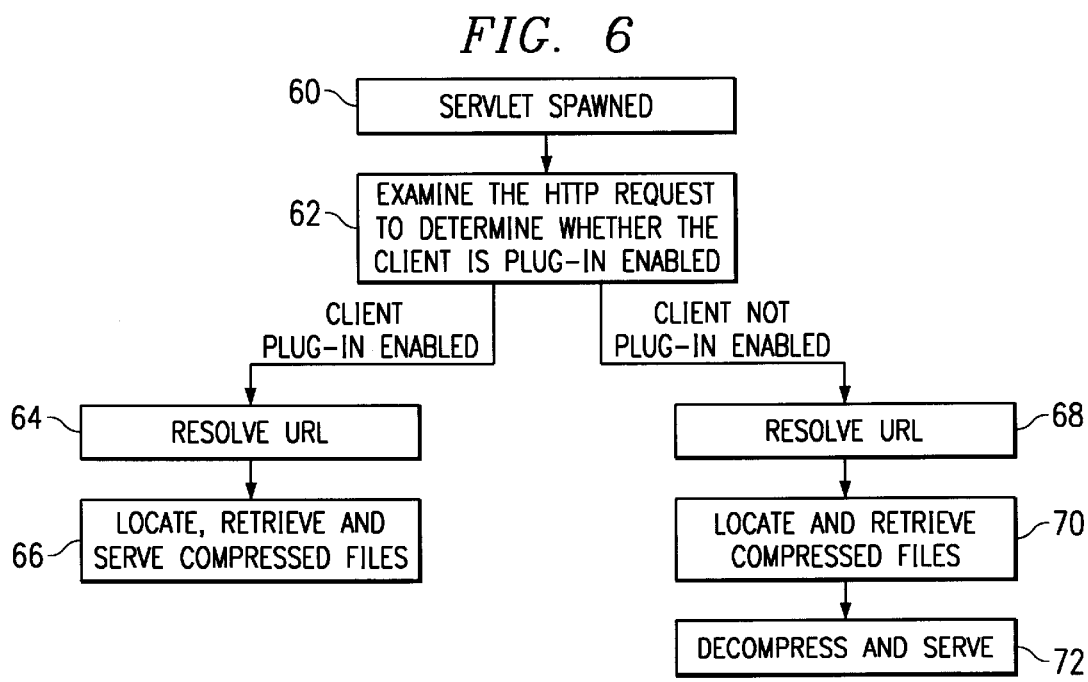
FIG. 6 is a flowchart of the service ( ) routine of the servlet.

Referring now to FIG. 5, each servlet 44 is controlled by a servlet manager 50, which is part of the existing Web server infrastructure. Whenever a new client attaches to the server, the servlet manager 50 instantiates a new service thread, thereby generating a new instance 52 of the servlet. Each servlet comprises three (3) basic routines: an init ( ) routine 54, a destroy ( ) routine 56, and a service ( ) routine 58. The init ( ) routine 54 provides initialization functionality (typically on a "one-time" basis). These are the functions that enable the servlet to be recognized and managed by the servlet manager and other server functions. The destroy ( ) routine 56 selectively destroys the servlet, which is an atypical operation. The service ( ) routine 58 is the primary engine of the servlet. In particular, the service ( ) routine is used to satisfy the GET or PUT HTTP request received from the client (and that spawned the servlet instance). This process is now described in more detail below and in conjunction with the flowchart of FIG. 6.

The service ( ) routine provides the basic operating functionality of the servlet. As noted above, an instance of the servlet is spawned upon receipt of an HTTP transaction request (e.g., a GET or PUT) from the client. As previously described, the client may be a conventional Windows-based machine (having a full HTML feature set), or a pervasive computing device (having a less than full-feature set). The routine begins at step 60 when the servlet is spawned. At step 62, the routine initially examines the HTTP request to determine whether the client machine is plug-in enabled. If the client relies on the HTTP 401 authentication method and the browser supports cookies, step 62 simply examines the cookie. Alternative techniques may be used to determine whether the client machine has decompression functionality. If the client is plug-in enabled, the routine branches to step 64 to resolve the URL. This step identifies the specific files on the DASD that must be served in response to the request. As noted above, the daemon process typically aggregates a given Web site (comprising many files of a subdirectory) into a single file. Thus, step 64 is useful in identifying the particular files that must be served. In step 64, the servlet also resolves connections when the client requests only partial content requested from within a compressed group of files. At step 66, the compressed files are located, retrieved and served to the client. Alternatively, if the client is not plug-in enabled, the routine branches (from step 62) to step 68. In this step, the service routine resolves the URL as previously noted. The requested files are then located and retrieved in step 70. In step 72, these files are decompressed "on-the-fly" and then served in step 72. Following the AddLog function (as previously described with respect to FIG. 2), the service ( ) routine of the servlet terminates. Control is then returned back to the servlet manager.

The servlet process thus has several functions. Its primary function is to communicate with and resolve client server requests and connections. For enabled clients, the process streams data in compressed format. For non-enabled client systems, the process decompresses data on-the-fly as the data is served. The process thereby optimizes file streams served from the Web server.

In a given transaction, the client establishes the connection to the servlet. The servlet determines that client is requesting a particular URL (representing a compressed set of files) within a compressed file. The servlet then serves that file as a binary string. Of course, multiple instances of the servlet operate concurrently on the server under the control of the servlet manager, and this set of processes operates asynchronously with respect to the daemon process.

Figure 7:
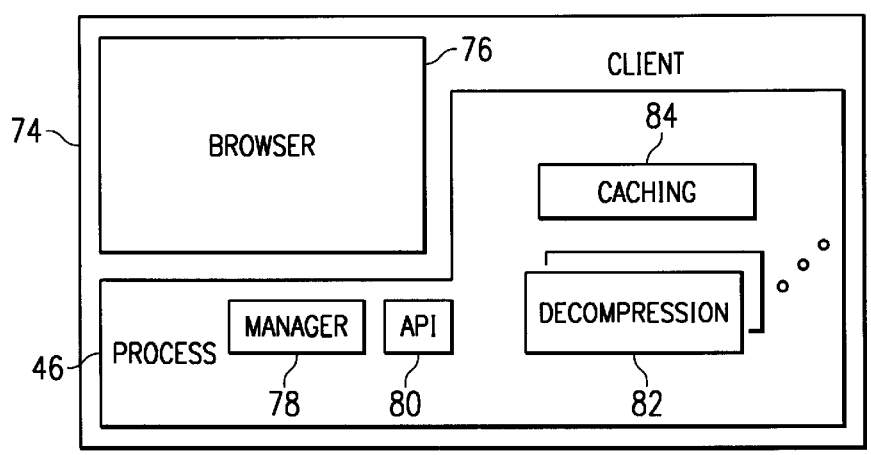
FIG. 7 is a block diagram of the client process of the present invention.

Referring now to FIG. 7, a representative client machine 74 includes a Web browser 76 for issuing client requests. As noted above, client machine 74 may be plug-in enabled to include the third process 46. Third process includes a process manager 78, an API 80, and a decompression routine 82. Using the API, different types of decompression routines 80 are plug compatible with the architecture. The process manager 78 receives the compressed files served from the servlet process instance and controls the decompression routine to process these files. The decompressed files output from the decompression routine 82 are then passed to conventional browser routines for rendering in the usual manner.

When clients are plug-in enabled, the servlet process 42 and the respective client process 46 include additional functionality to improve overall server delivery and client browser performance. Thus, for example, the servlet may include a "look ahead" routine 55 (in FIG. 5) that serves a file containing compressed versions of other Web pages which a user requesting the requested page is likely to request. By pre-serving these pages (before they are actually requested), the client browser avoids having to access the network when the page(s) are actually needed. In like manner, the client process 46 includes a caching routine 84 that responds to a request for a Web page to determine whether a recently retrieved, compressed version of the requested page is already cached in the browser page cache. If so, the routine processes the cached compressed version of the requested page through the decompression routine instead of issuing the request to the servlet.

According to another feature of the present invention, a client browser provides a Web server with an indication that it desires compressed content when the Web page is requested (or in a subsequent HTTP request). This indication may be provided, for example, in a cookie. The indication may also include the type of decompression routine(s) enabled on the client. The server (assuming it has the compressed content requested) then serves the compressed page in the manner previously described. Upon receipt, the browser (or the plug-in) decompresses and renders the page.

One of ordinary skill in the art will appreciate that the particular compression and decompression routines are complementary. The process APIs enable the designer to use any convenient type of compression/decompression functionality for the particular device and/or application. The present invention does not require specifying any particular type of compression or decompression routine; one of ordinary skill will appreciate that the invention is directed toward providing a generic CODEC-pluggable methodology designed to support any type of compression/decompression functionality.

Therefore, client requests that can be serviced with compressed files are satisfied in that manner. On the contrary, HTTP request from clients that are not plug-in enabled are serviced in the conventional manner. Thus, the inventive technique does not rely upon network demand to determine which version of the page is served. Server side functionality is optimized, however, by compressing and transcoding irrespective of network demand. This architecture provides seamless and efficient server operations.

The invention is thus useful in optimizing storage of Web server content. Once configured and initiated, the daemon process 42 begins recursively creating compressed files (in the aggregate or separately). The daemon process (depending on its configuration settings) may then delete or archive the original files. The servlet process 44 is then started. The servlet process handles client HTTP (or other protocol) requests and dynamically decompresses data to the client (depending on whether the client is configured to handle the compressed data stream). As part of the compression step (by the servlet), preferably the servlet also includes the architected interface (namely, the API) that allows for specific types of compression. Moreover, this interface allows for a plurality of data manipulation routines to be registered with the servlet. Such routines may produce an alternate form of the data that is specifically optimized for various "pervasive" type devices.

The present invention provides significant advantages. The use of the first and second processes, operating asynchronously, increases the delivery effectiveness of the server by conserving storage space on the server and (assuming client support) reducing the size of the data stream served to the client. Moreover, even in the case where the client is not plug-in enabled, the pair of server processes is quite beneficial in reducing the DASD storage requirements. The first process is engineered to produce optimized data streams, which increases the effectiveness of rendering the server files on client browsers.

Moreover, the separate functionality of the two server processes ensures that the deamon process runs asynchronously to other server functions (namely, in the background). This enables the server to selectively archive and/or delete files that previously existed on the server in an uncompressed state even as the server is responding to client requests. The resulting server architecture is robust, efficient and readily scaleable.

The deamon and servlet processes comprise a server side mechanism for dynamically compressing and serving content residing on the Web server. This mechanism has the benefit of increasing the delivery effectiveness of the Web server transmission protocols, decreasing server side DASD requirements, decreasing client side caching and DASD requirements, and providing transparent scalability.

The present invention obviates investment in faster and more expensive hardware peripherals and systems, as the processes free up server DASD requirements significantly (e.g., up to 10–20×). Thus, servers that include hardware that is on the fringe of performance can now extend the life of their hardware and thus preserve their existing investment. Web site administrators thus may use this invention to host more content on what are now hardware-constrained servers.

As noted above, the above-described functionality preferably includes a server side piece and a client side piece. The server side piece comprises the daemon and servlet processes. The client side piece is the plug-in enabled code, preferably a Java applet. In either case, the functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims.

We claim:

1. A method for increasing effective delivery of contents supported on a server, comprising the steps of:
   using a first process operating on the server to compress given content into a compressed file; and
   as the first process is operating, using a second process operating on the server to respond to client requests for the content wherein the first process is a platform executable and the second process is a Java servlet.

2. A server, comprising:
   a storage device;
   a first process for compressing given content into a compressed file and storing the compressed file in the storage device; and
   a second process operating asynchronously with respect to the first process for responding to client requests for the content wherein the first process is a platform executable and the second is a Java servlet.

3. A server, comprising:

a storage device;

a first process for compressing given content into a compressed file and storing the compressed file in the storage device; and a second process operating asynchronously with respect to the first process for responding to client request for the content wherein the first process also transcodes content from a first markup language format to a second markup language format.

4. A computer program product in a computer-readable medium, comprising;

a first process executable on the server for compressing given content into a compressed filed and storing the compressed file in a storage device; and a second process executable on the server and operating asynchronously with respect to the first process for responding to client request for the content wherein the first process is a platform executable and the second process is a Java servlet.

5. A computer program product in a computer-readable medium, comprising;

a first process executable on the server for compressing given content into a compressed filed and storing the compressed file in a storage device; and a second process executable on the server and operating asynchronously with respect to the first process for responding to client request for the content wherein the first process also transcodes content from a first markup language to a second markup language format.

* * * * *

UNITED STATES PATENT AND TRADEMARK OFFICE
CERTIFICATE OF CORRECTION

PATENT NO. : 6,604,106 B1
DATED : August 5, 2003
INVENTOR(S) : William Kress Bodin and Ted Ralph Mueller It is certified that error appears in the above-identified patent and that said Letters Patent is hereby corrected as shown below:

Column 9,
Line 14, please replace "filed" with -- file --.

Column 10,
Line 7, please replace "filed" with -- file --.

Signed and Sealed this

Twenty-second Day of June, 2004

JON W. DUDAS
*Acting Director of the United States Patent and Trademark Office*